(12) United States Patent
Bauer et al.

(10) Patent No.: US 10,619,402 B2
(45) Date of Patent: Apr. 14, 2020

(54) APPARATUS AND METHOD FOR A MATERIAL CONTROL DEVICE WITH A SLIDING DOOR

(71) Applicant: Carlson Paving Products, Inc., Tacoma, WA (US)

(72) Inventors: Robert Bauer, Tacoma, WA (US); Kevin Comer, Puyallup, WA (US); Moustafa Sou, Olympia, WA (US)

(73) Assignee: Carlson Paving Products, Inc., Tacoma, WA (US)

( * ) Notice: Subject to any disclaimer, the term of this patent is extended or adjusted under 35 U.S.C. 154(b) by 163 days.

(21) Appl. No.: 15/940,239

(22) Filed: Mar. 29, 2018

(65) Prior Publication Data
US 2018/0283086 A1    Oct. 4, 2018

Related U.S. Application Data

(60) Provisional application No. 62/479,033, filed on Mar. 30, 2017.

(51) Int. Cl.
| | | |
|---|---|---|
| *E01C 19/02* | (2006.01) |
| *E06B 3/46* | (2006.01) |
| *B65G 33/14* | (2006.01) |
| *E06B 3/50* | (2006.01) |
| *E02F 3/76* | (2006.01) |

(52) U.S. Cl.
CPC .............. *E06B 3/46* (2013.01); *B65G 33/14* (2013.01); *E02F 3/76* (2013.01); *E06B 3/509* (2013.01); *E05Y 2400/322* (2013.01); *E05Y 2600/20* (2013.01)

(58) Field of Classification Search
CPC ... E06B 3/46; E06B 3/509; E02F 3/76; E05Y 2400/322; E05Y 2600/20; B65G 33/14; E01C 19/02; E01C 19/40; E01C 2301/10
USPC ..................... 404/72, 75, 101, 118
See application file for complete search history.

(56) References Cited

U.S. PATENT DOCUMENTS

| | | | | |
|---|---|---|---|---|
| 5,234,128 A * | 8/1993 | Hill | ..................... | E01C 19/2005 222/52 |
| 5,387,051 A * | 2/1995 | Valente | ................... | E04F 21/20 404/84.05 |
| 5,405,214 A * | 4/1995 | Campbell | ............... | E01C 19/48 404/105 |
| 5,460,649 A * | 10/1995 | Strassman | ............... | C04B 26/26 106/282 |
| 5,590,976 A * | 1/1997 | Kilheffer | ................. | E01C 19/46 177/119 |

(Continued)

*Primary Examiner* — Raymond W Addie
(74) *Attorney, Agent, or Firm* — Chambliss, Bahner & Stophel, P.C.

(57) ABSTRACT

A material control device having a housing, a material discharge door that has a left end, a right end, and a central axis and is adapted to be moved between a closed position and an open position, and a means for moving the material discharge door between the closed position and the open position. The means for moving the material discharge door between the closed position and the open position slidingly moves the material discharge door between the closed position and the open position. A method for controlling material discharge including providing a material control device and moving the material discharge door between the closed position and the open position.

20 Claims, 8 Drawing Sheets

(56) References Cited

U.S. PATENT DOCUMENTS

| | | | | |
|---|---|---|---|---|
| 6,007,272 A * | 12/1999 | Macku | ............... | E01C 19/1077 366/319 |
| 6,161,986 A * | 12/2000 | Smith | ................... | E01C 19/201 222/52 |
| 6,345,931 B1 * | 2/2002 | Capece | .............. | E01C 19/2025 404/101 |
| 10,246,833 B2 * | 4/2019 | Blank | ................... | E01C 19/202 |
| 2004/0179895 A1 * | 9/2004 | Lee | ...................... | E01C 19/405 404/101 |
| 2005/0058507 A1 * | 3/2005 | Musil | ................... | E01C 19/185 404/108 |
| 2010/0178107 A1 * | 7/2010 | Braddy | ................ | E01C 19/182 404/75 |

\* cited by examiner

APPARATUS AND METHOD FOR A MATERIAL CONTROL DEVICE WITH A SLIDING DOOR

CROSS-REFERENCES TO RELATED APPLICATIONS/PATENTS

This application relates back to and claims the benefit of priority from U.S. Provisional Application for Patent Ser. No. 62/479,033 titled "Sliding Door" and filed on Mar. 30, 2017.

FIELD OF THE INVENTION

The present invention relates generally to apparatuses and methods for material control devices, and particularly to apparatuses and methods for material control devices with material discharge doors.

BACKGROUND AND DESCRIPTION OF THE PRIOR ART

It is known to use apparatuses and methods to control the discharge of material from a material control device. Conventional apparatuses and methods, however, suffer from one or more disadvantages. For example, conventional material control devices and methods use pivoting doors to control the discharge of material. As a result, the ground clearance of the material control device is undesirably reduced and the pivoting doors are undesirably susceptible to damage. Conventional material control apparatuses and methods also do not open and close the material discharge doors from the center of the door. As a result, the material discharge doors tend to undesirably bend, flex, or warp over time and the doors undesirably fail to fully close and smoothly move between the open and closed positions. Further, conventional material control devices and methods are manually operated. As a result, the operator is required to adjust the material discharge doors while also controlling other functions such as steering a paver and controlling the speed of the paver. The manually-operated material discharge doors are also undesirably susceptible to human error. Still further, conventional material control devices and methods do not automatically control, adjust, or meter the rate of discharge of material. In addition, conventional material control devices and methods are not adapted to be opened and closed at any time and they undesirably compact or pinch the material to be discharged when the pivoting door is closed. Conventional material control devices and methods are also undesirably slow and unresponsive and undesirably expose their actuators to the material to be discharged.

It would be desirable, therefore, if an apparatus and method for a material control device could be provided that would use sliding doors to control the discharge of material. It would also be desirable if such an apparatus and method for a material control device could be provided that would not reduce ground clearance and be susceptible to damage. It would be further desirable if such an apparatus and method for a material control device could be provided that would open and close the material discharge doors from the center of the door. It would be still further desirable if such an apparatus and method for a material control device could be provided that would have material discharge doors that do not tend to undesirably bend, flex, or warp over time, fail to fully close, and fail to smoothly move between the open and closed positions. In addition, it would be desirable if such an apparatus and method for a material control device could be provided that would not be manually operated. It would also be desirable if such an apparatus and method for a material control device could be provided that would not require the operator to adjust the material discharge doors while also controlling other functions such as steering a paver and controlling the speed of the paver. Further, it would be desirable if such an apparatus and method for a material control device could be provided that would minimize or eliminate human error. Still further, it would be desirable if such an apparatus and method could be provided that would automatically control, adjust, or meter the rate of discharge of material.

In addition, it would be desirable if such an apparatus and device for a material control device could be provided that would be adapted to be opened and closed at any time and not compact or pinch the material to be discharged when the door is closed. It would also be desirable is such an apparatus and method for a material control device could be provided that would not be slow and unresponsive or expose its actuators to the material to be discharged.

Advantages of the Preferred Embodiments of the Invention

Accordingly, it is an advantage of the preferred embodiments of the invention claimed herein to provide an apparatus and method for a material control device that uses sliding doors to control the discharge of material. It is also an advantage of the preferred embodiments of the invention claimed herein to provide an apparatus and method for a material control device that does not reduce ground clearance and is not susceptible to damage. It is another advantage of the preferred embodiments of the invention claimed herein to provide an apparatus and method for a material control device that opens and closes the material discharge doors from the center of the door. It is still another advantage of the preferred embodiments of the invention claimed herein to provide an apparatus and method for a material control device that does not bend, flex, or warp the door over time, fail to fully close the door, or fail to smoothly move the door between the open and closed positions. It is yet another advantage of the preferred embodiments of the invention claimed herein to provide an apparatus and method for a material control device that is not manually operated. In addition, it is an advantage of the preferred embodiments of the invention claimed herein to provide an apparatus and method for a material control device that does not require the operator to adjust the material discharge doors while also controlling other functions such as steering a paver and controlling the speed of the paver. It is an additional advantage of the preferred embodiments of the invention claimed herein to provide an apparatus and method for a material control device that minimizes or eliminates human error. It is also an advantage of the preferred embodiments of the invention claimed herein to provide an apparatus and method for a material control device that automatically meters, controls, and adjusts the discharge of material. It is another advantage of the preferred embodiments of the invention claimed herein to provide an apparatus and method for a material control device that is adapted to be opened and closed at any time and not compact or pinch the material to be discharged when the door is closed. It is still another advantage of the preferred embodiments of the invention claimed herein to provide an apparatus and method for a material control device that is fast and responsive and does not expose its actuators to the material to be discharged.

Additional advantages of the preferred embodiments of the invention will become apparent from an examination of the drawings and the ensuing description.

Explanation of the Technical Terms

As used herein, the term "actuator" means any device, mechanism, assembly or combination thereof that is adapted to move or be moved between a retracted position and an extended position so as to impart a mechanical force. The term "actuator" includes without limitation linear actuators, rotary actuators, hydraulic cylinders, hydraulic rotary actuators, pneumatic cylinders, springs and the like.

SUMMARY OF THE INVENTION

The apparatus of the invention comprises a material control device having a housing, a material discharge door that has a left end, a right end, and a central axis and is adapted to be moved between a closed position and an open position, and a means for moving the material discharge door between the closed position and the open position. In the preferred embodiments of the material control device, the means for moving the material discharge door between the closed position and the open position slidingly moves the material discharge door between the closed position and the open position.

The method of the invention comprises a method for controlling material discharge. The preferred method for controlling material discharge comprises providing a material control device having a housing, a material discharge door that has a left end, a right end, and a central axis and is adapted to be moved between a closed position and an open position, and a means for moving the material discharge door between the closed position and the open position. In the preferred embodiments of the material control device, the means for moving the material discharge door between the closed position and the open position slidingly moves the material discharge door between the closed position and the open position. The preferred method also comprises moving the material discharge door between the closed position and the open position.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Referring now to the drawings, the preferred embodiment of the material control device in accordance with the present invention is illustrated by FIGS. 1 through 8. As shown in FIGS. 1-8, the preferred material control device uses sliding doors to control the discharge of material, does not reduce ground clearance, and is not susceptible to damage. The preferred material control device also opens and closes the material discharge doors from the center of the door. The preferred material control device does not bend, flex, or warp the doors over time, fail to fully close the doors, or fail to smoothly move the doors between the open and closed positions. The preferred material control device is also not manually operated so it does not require the operator to adjust the material discharge doors while also controlling other functions such as steering a paver and controlling the speed of the paver. The preferred material control device automatically controls the movement, adjustment, and position of the material discharge doors and thereby controls, meters, and adjusts the material flow rate and minimizes or eliminates human error. The preferred material control device doors are adapted to be opened and closed at any time and they do not compact or pinch the material to be discharged when the door is closed. The preferred material control device is also fast and responsive.

Figure 1:
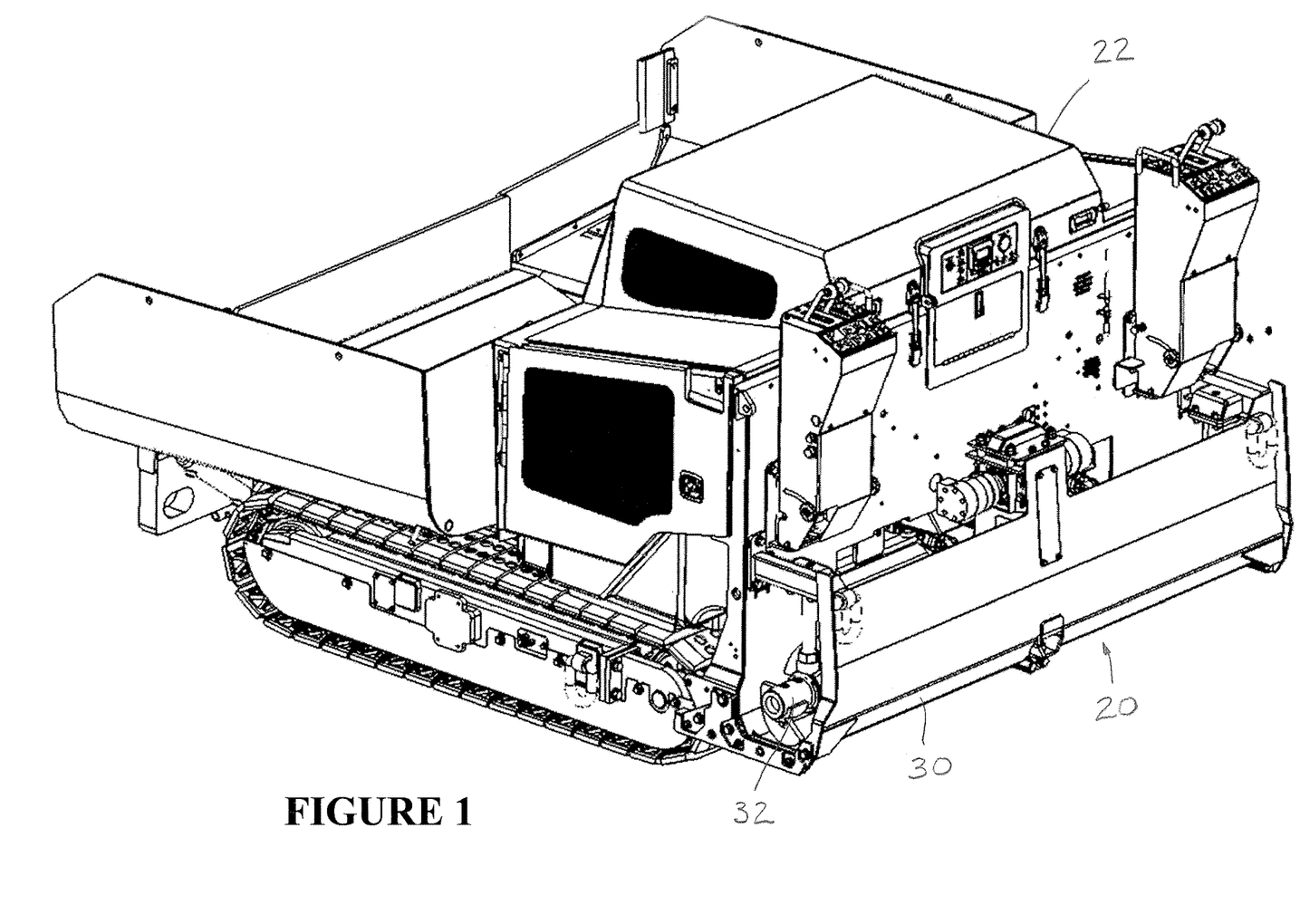
FIG. 1 is a back perspective view of the preferred embodiment of the material control device in accordance with the present invention shown on an exemplary paver.

Referring now to FIG. 1, a back perspective view of the preferred embodiment of the material control device in accordance with the present invention is illustrated on an exemplary paver. As shown in FIG. 1, the preferred material control device is designated generally by reference numeral 20. Preferred material control device 20 is disposed at the back of exemplary paver 22 and comprises housing 30 and auger 32. While FIG. 1 illustrates the preferred configuration and arrangement of the material control device, it is contemplated within the scope of the invention that the material control device may be of any suitable configuration and arrangement.

Figure 2:
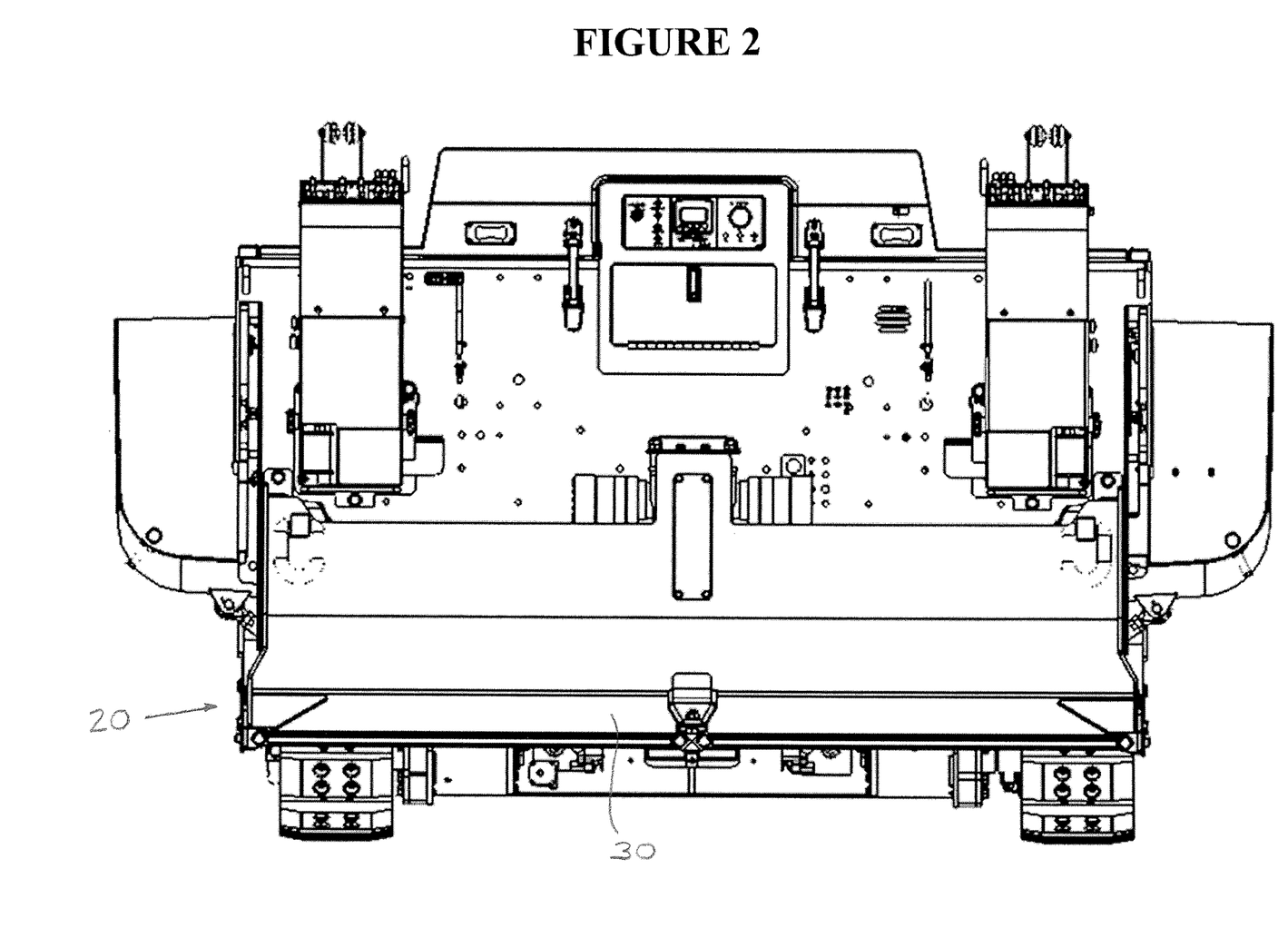
FIG. 2 is a back view of the preferred material control device illustrated in FIG. 1.

Referring now to FIG. 2, a back view of preferred material control device 20 is illustrated. As shown in FIG. 2, preferred material control device 20 comprises housing 30.

Figure 3:
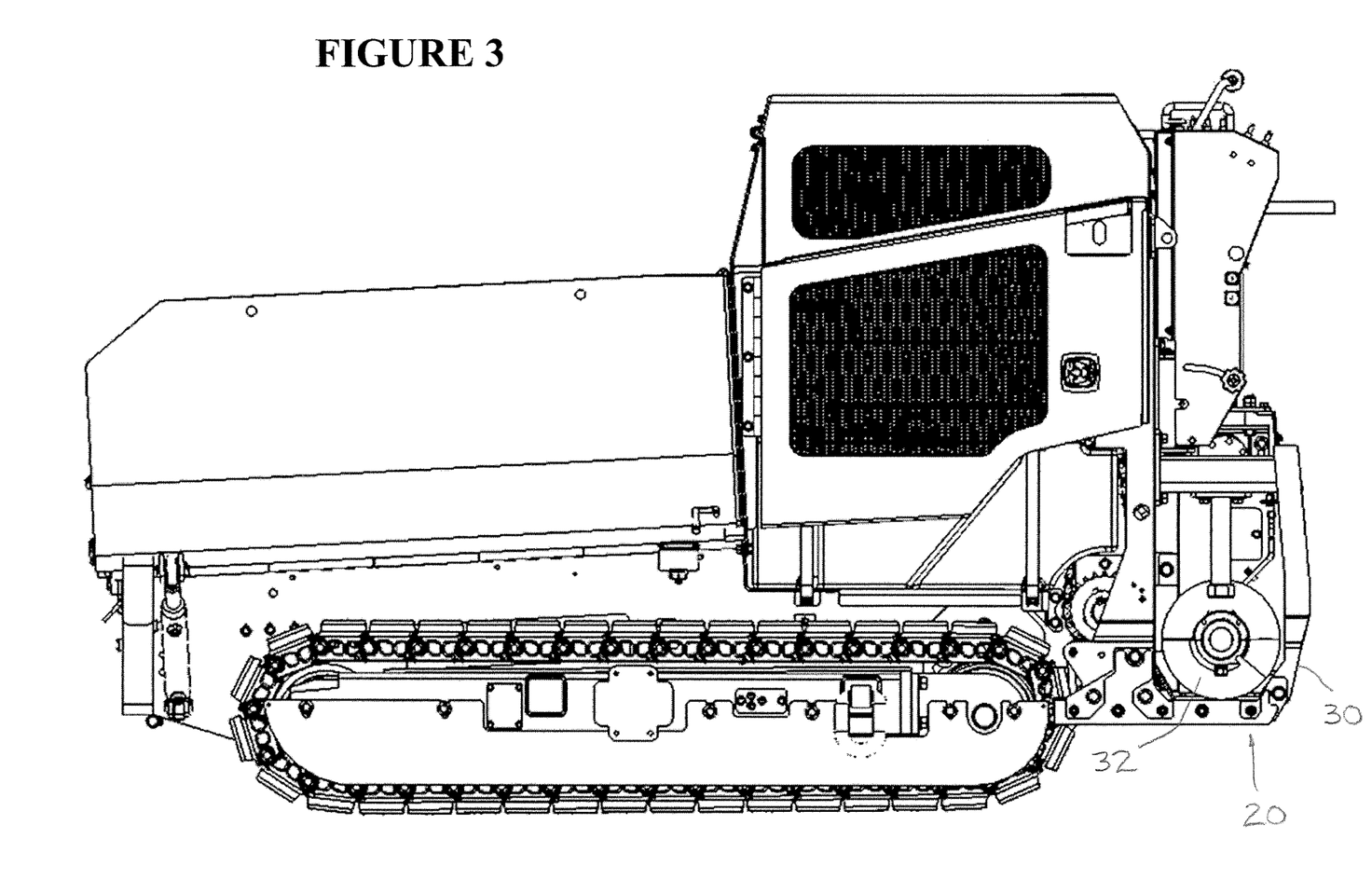
FIG. 3 is a right side view of the preferred material control device illustrated in FIGS. 1-2.

Referring now to FIG. 3, a right side view of preferred material control device 20 is illustrated. As shown in FIG. 3, preferred material control device 20 comprises housing 30 and auger 32.

Figure 4:
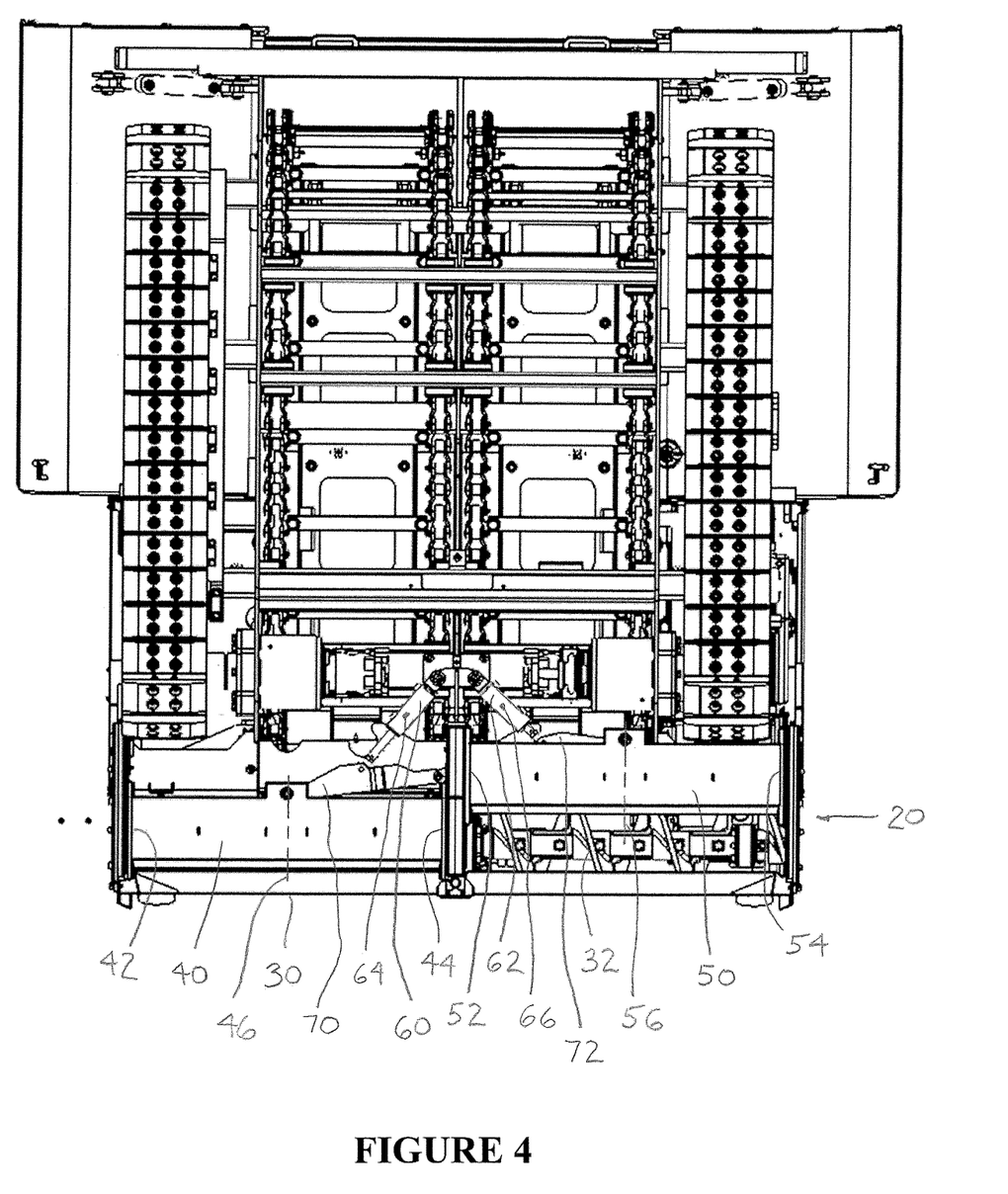
FIG. 4 is a bottom view of the preferred material control device illustrated in FIGS. 1-3.

Referring now to FIG. 4, a bottom view of preferred material control device 20 is illustrated. As shown in FIG. 4, preferred material control device 20 comprises housing 30 and auger 32 which is disposed in the housing. Preferred control device 20 also comprises a material discharge door that has a left end, a right end, and a central axis and is adapted to be moved between a closed position and an open position. Preferably, the material discharge door is adapted to be automatically and slidingly moved between a closed position and an open position. More particularly, preferred material control device 20 comprises first material discharge door 40 which is adapted to be moved between a closed position and an open position and has first material discharge door left end 42, first material discharge door right end 44, and first material discharge door central axis 46. Preferred first material discharge door 40 is illustrated in a closed position. Preferred material control device 20 further comprises second material discharge door 50 which is adapted to be moved between a closed position and an open position and has second material discharge door left end 52, second material discharge door right end 54, and second material discharge door central axis 56. Preferred second material discharge door is illustrated in an open position.

Still referring to FIG. 4, preferred material control device 20 also comprises a means for moving the material discharge door between the closed position and the open position. Preferably, the means for moving the material discharge door between the closed position and the open position automatically and slidingly moves the material discharge door between the closed position and the open position. Preferably, the means for moving the material discharge door is pivotally connected to the material discharge door along the material discharge door central axis. More particularly, preferred material control device 20 comprises a means for moving the first material discharge door between the closed position and the open position such as first actuator 60 and a means for moving the second material discharge door between the closed position and the open position such as second actuator 62. Preferred first actuator 60 comprises first sensor 64 and second actuator 62 comprises second sensor 66, both of which are adapted to determine the position of their respective actuator in order to control or meter the material flow rate. Preferably, the means for moving the first material discharge door between the closed position and the open position also comprises first linkage 70 and the means for moving the second material discharge door between the closed position and the open position comprises second linkage 72. Preferred first linkage 70 is pivotally connected to first material discharge door 40 along first material discharge door central axis 46 and preferred second linkage 72 is pivotally connected to second material discharge door 50 along second material discharge door central axis 56. Preferably, first material discharge door 40 and second material discharge door 50 are adapted to be slidingly moved between the closed position and the open position automatically and independently of each other. While FIG. 4 illustrates the preferred sensors, it is contemplated within the scope of the invention that sensors may be disposed at a distance from the actuators.

Figure 5:
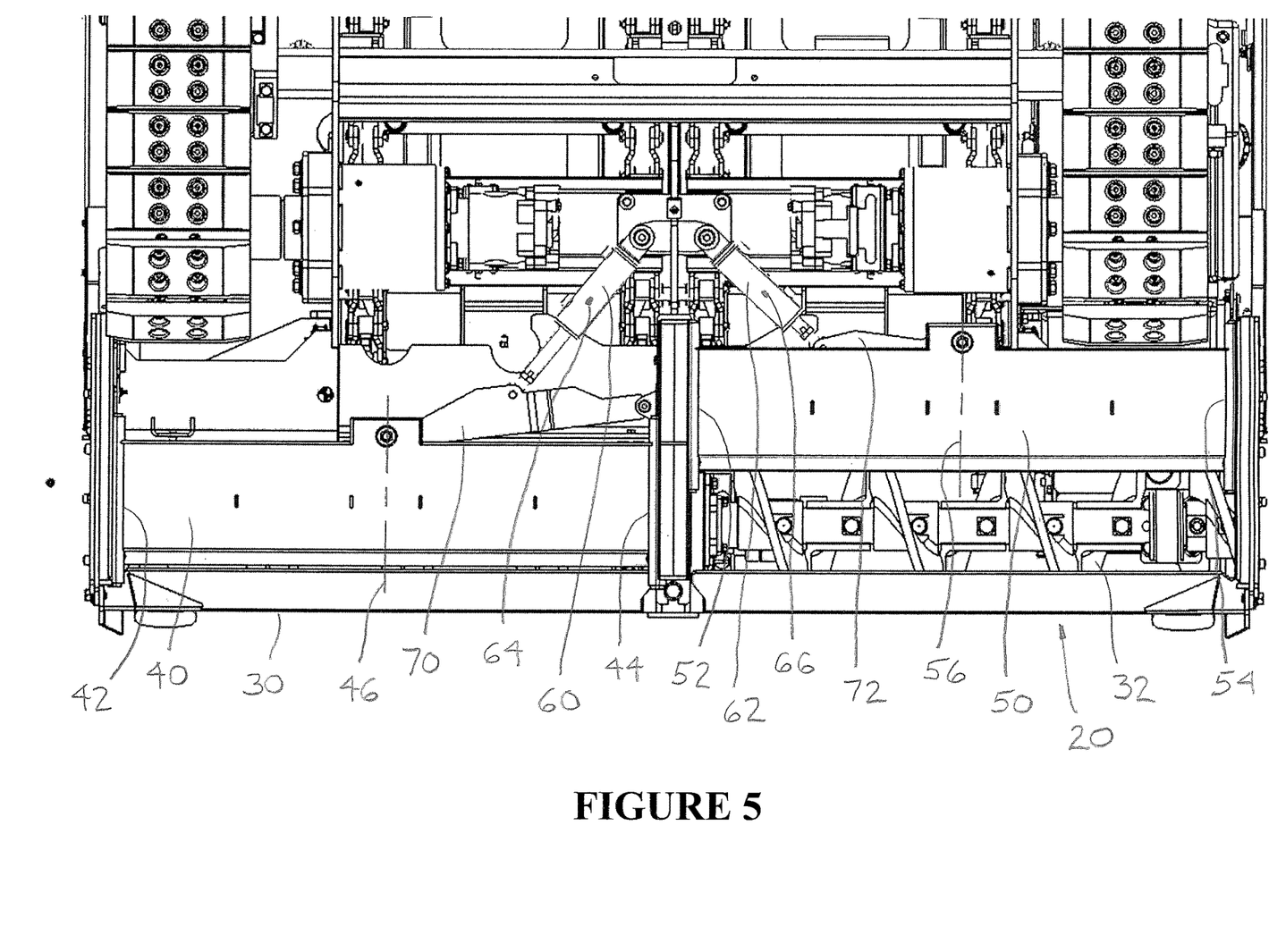
FIG. 5 is a bottom view of the preferred material control device illustrated in FIGS. 1-4.

Referring now to FIG. 5, a bottom view of preferred material control device 20 is illustrated. As shown in FIG. 5, preferred material control device 20 comprises housing 30, auger 32, first material discharge door 40 in a closed position, first material discharge door left side 42, first material discharge door right side 44, first material discharge door center axis 46, second material discharge door 50 in an open position, second material discharge door left side 52, second material discharge door right side 54, second material discharge door center axis 56, first actuator 60, second actuator 62, first sensor 64, second sensor 66, first linkage 70, and second linkage 72.

Figure 6:
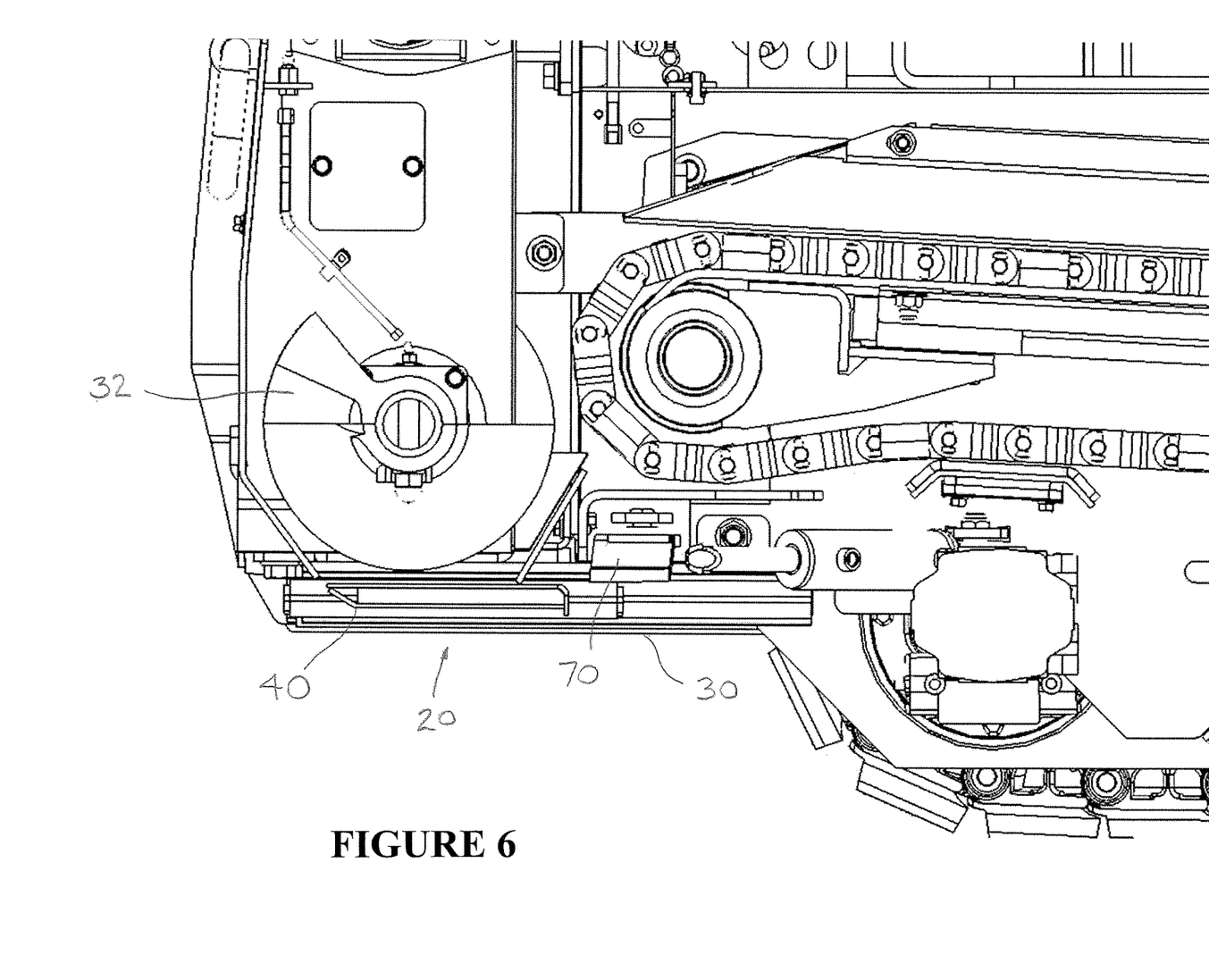
FIG. 6 is a left side partial sectional view of the preferred material control device illustrated in FIGS. 1-5 showing the material discharge door in the closed position.

Referring now to FIG. 6, a left side partial sectional view of preferred material control device 20 is illustrated with first material discharge door 40 in the closed position. As shown in FIG. 6, preferred material control device 20 comprises housing 30, auger 32, first material discharge door 40, and first linkage 70.

Figure 7:
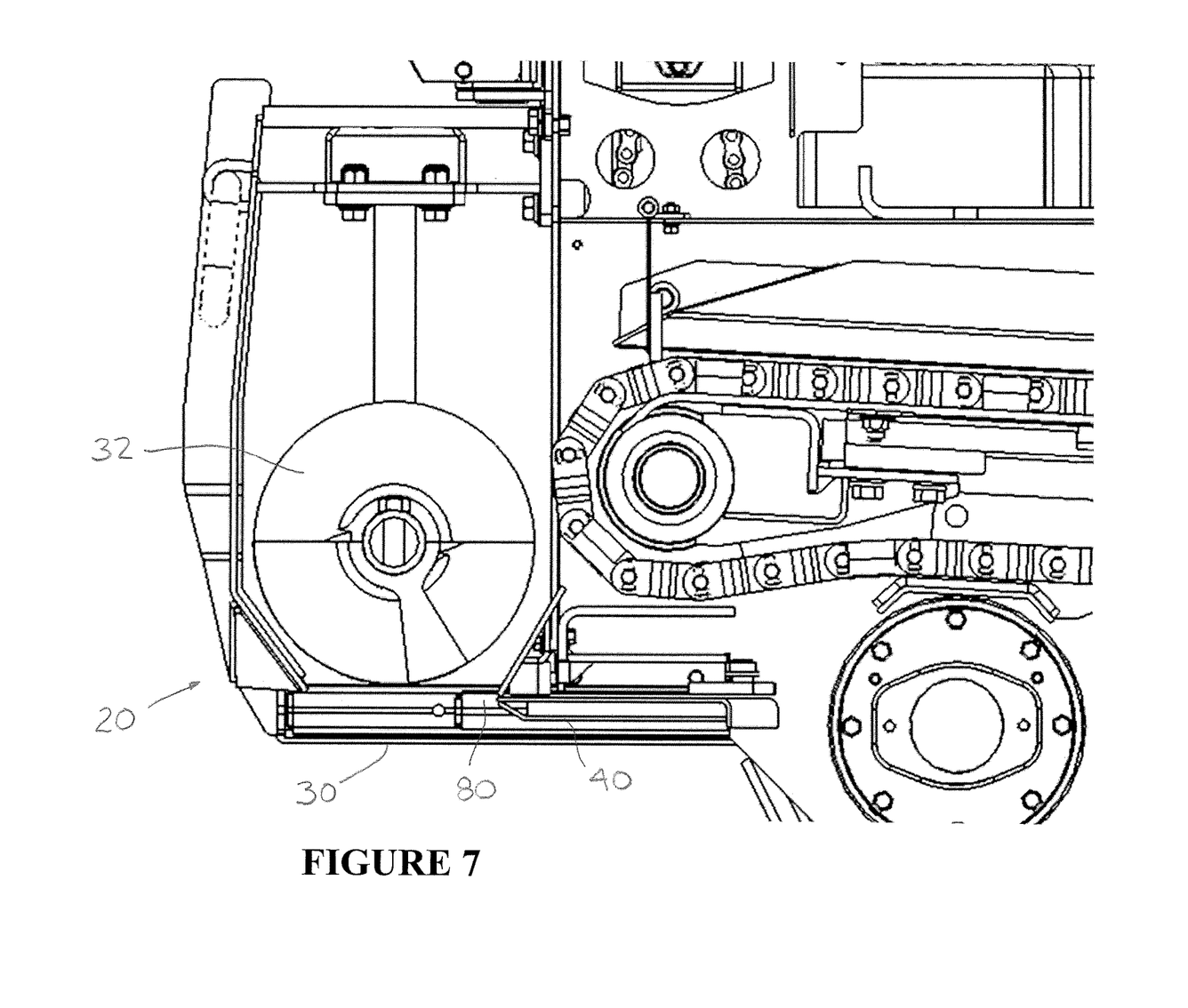
FIG. 7 is a left side partial sectional view of the preferred material control device illustrated in FIGS. 1-6 showing the material discharge door in the open position.

Referring now to FIG. 7, a left side partial sectional view of preferred material control device 20 is illustrated with first material discharge door 40 in the open position. As shown in FIG. 7, preferred material control device 20 comprises housing 30, auger 32, and first material discharge door 40. Preferred first material discharge door 40 slidingly moves between the closed position and the open position in a pair of channels 80.

Figure 8:
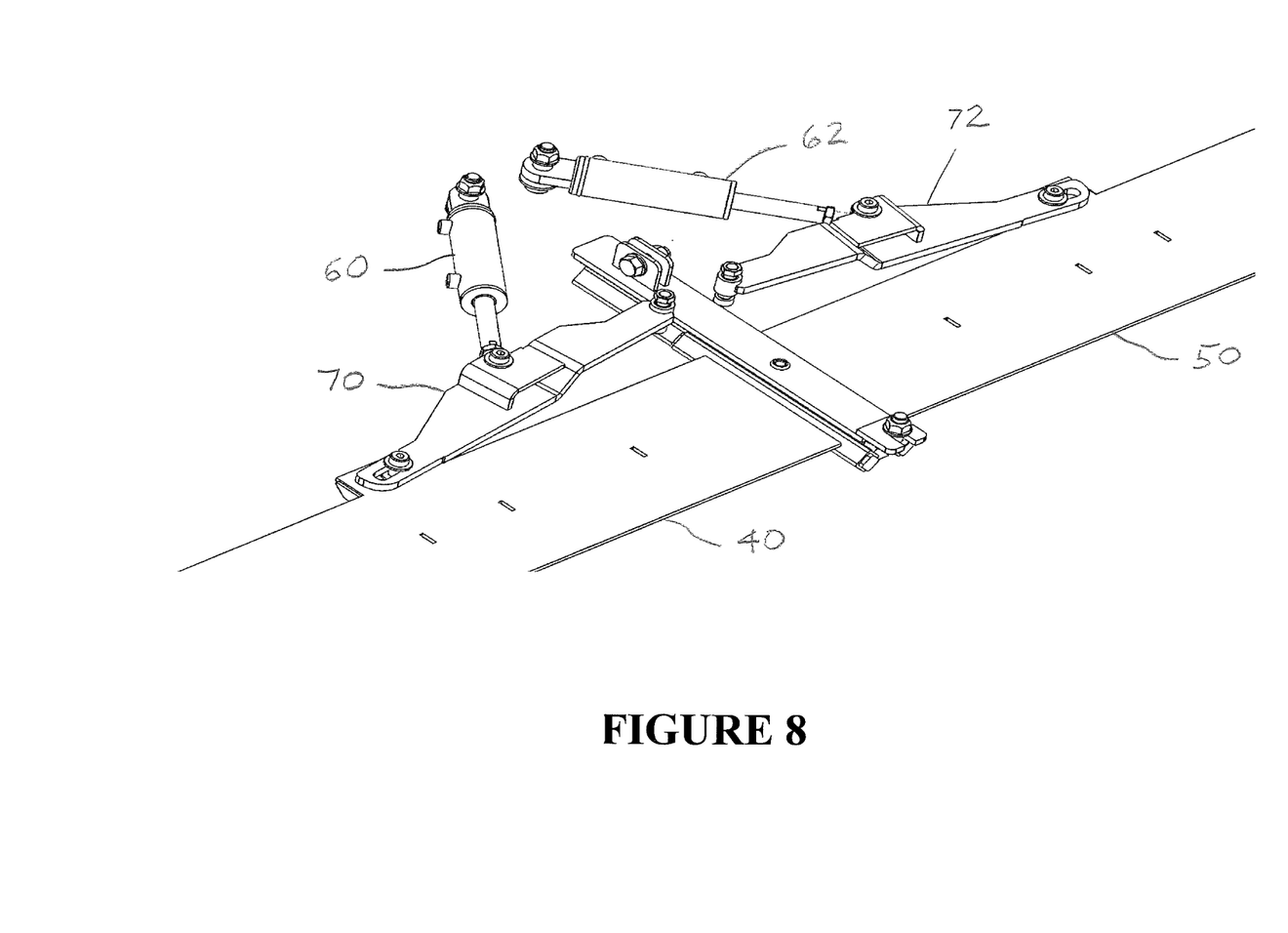
FIG. 8 is a perspective isolated view of the preferred material discharge doors, actuators, and linkage.

Referring now to FIG. 8, a perspective isolated view of the preferred material discharge doors, actuators, and linkage is illustrated. More particularly, first material discharge door 40, second material discharge door 50, first actuator 60, second actuator 62, first linkage 70, and second linkage 72 are illustrated. While FIG. 8 illustrates the preferred configuration and arrangement of the doors, the actuators, and the linkage, it is contemplated within the scope of the invention that the doors, the actuators, and the linkage may be of any suitable configuration and arrangement.

The invention also comprises a method for controlling material discharge. The preferred method comprises providing a material control device. The preferred material control device comprises a material discharge door that has a left end, a right end, and a central axis and is adapted to be moved between a closed position and an open position. The preferred material control device also comprises a means for moving the material discharge door between the closed position and the open position. Preferably, the means for moving the material discharge door between the closed position and the open position slidingly moves the material discharge door between the closed position and the open position. The preferred method also comprises moving the material discharge door between the closed position and the open position.

In operation, several advantages of the preferred embodiments of the material discharge device are achieved. For example, the preferred embodiments of the material discharge device are adapted to automatically determine the position of the material discharge door based upon the displacement of the actuator via a sensor. As a result, the preferred material discharge devices are adapted to automatically control material flow rate. In other preferred embodiments of the material discharge device, a sensor determines the rotational speed of the auger in order to automatically control material flow rate. For example, the preferred material control device may automatically close the material discharge door or doors when the auger is not rotating, automatically partially open the material discharge door or doors when the auger is rotating slowly, and automatically fully open the material discharge door or doors when the auger is rotating at full speed. In the preferred embodiments of the material control device, the material discharge door or doors automatically function as a material flow gate. The preferred embodiments of the material control device also do not reduce the ground clearance of the item of equipment, compact or pinch the material to be discharged when the doors are closed, or cause the material discharge or damper doors to bend or flex. In addition, the preferred embodiments of the material control device include a plurality of material discharge doors that may be operated independently so that the material discharge rate may be different at different locations of a paving surface. Further, the preferred embodiments of the material control device include linkage which improves the responsiveness of the material discharge doors and position the actuators at a distance from the material to be discharged so they are not damaged by the material.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A material control device adapted for use on a paver having a front end, a back end, and an auger, said material control device comprising:
   (a) a housing;
   (b) a material discharge door, said material discharge door having a left end, a right end, and a central axis and being adapted to be moved between a closed position and an open position;
   (c) a means for moving the material discharge door between the closed position and the open position;
   wherein the means for moving the material discharge door between the closed position and the open position slidingly moves the material discharge door between the closed position and the open position; and wherein the material discharge door is disposed in the back end of the paver below the auger; and wherein the material discharge door is disposed in a substantially horizontal position.

2. The material control device of claim 1 wherein the material discharge door slidingly moves between the closed position and the open position in a pair of channels.

3. The material control device of claim 1 wherein the material discharge door automatically slidingly moves between the closed position and the open position based on a rotational speed of the auger.

4. The material control device of claim 1 wherein the means for moving the material discharge door comprises an actuator.

5. The material control device of claim 1 wherein the means for moving the material discharge door is pivotally connected to the material discharge door along the material discharge door central axis.

6. The material control device of claim 1 further comprising a sensor adapted to determine a material discharge door position.

7. The material control device of claim 1 further comprising a second material discharge door and a means for moving the second material discharge door between the closed position and the open position.

8. The material control device of claim 7 wherein the material discharge door and the second material discharge door are adapted to be moved between the closed position and the open position independently of each other.

9. The material control device of claim 1 wherein the means for moving the material discharge door comprises linkage.

10. The material control device of claim 9 wherein the linkage is pivotally connected to the material discharge door along the material discharge door central axis.

11. A material control device adapted for use on a paver having a front end, a back end, and an auger, said material control device comprising:
   (a) a housing;
   (b) an auger, said auger being disposed in the housing;
   (c) a first material discharge door, said first material discharge door having a first material discharge door left end, a first material discharge door right end, and a first material discharge door central axis and being adapted to be moved between a closed position and an open position;
   (d) a second material discharge door, said second material discharge door having a second material discharge door left end, a second material discharge door right end, and a second material discharge door central axis and being adapted to be moved between a closed position and an open position;
   (e) a means for moving the first material discharge door between the closed position and the open position;
   (f) a means for moving the second material discharge door between the closed position and the open position;
   wherein the means for moving the first material discharge door between the closed position and the open position slidingly moves the first material discharge door between the closed position and the open position; and wherein the means for moving the second material discharge door between the closed position and the open position slidingly moves the second material discharge door between the closed position and the open position; and wherein the material discharge door is disposed in the back end of the paver below the auger; and wherein the material discharge door is disposed in a substantially horizontal position.

12. The material control device of claim 11 wherein the first material discharge door slidingly moves between the closed position and the open position in a first pair of channels and the second material discharge door slidingly moves between the closed position and the open position in a second pair of channels.

13. The material control device of claim 11 wherein the first material discharge door automatically slidingly moves between the closed position and the open position and the second material discharge door automatically slidingly moves between the closed position and the open position.

14. The material control device of claim 11 wherein the first material discharge door and the second material discharge door are adapted to be moved between the closed position and the open position independently of each other.

15. The material control device of claim 11 wherein the means for moving the first material discharge door comprises a first actuator and the means for moving the second material discharge door comprises a second actuator.

16. The material control device of claim 11 wherein the means for moving the first material discharge door is pivotally connected to the first material discharge door along the first material discharge door central axis and the means for moving the second material discharge door is pivotally connected to the second material discharge door along the second material discharge door central axis.

17. The material control device of claim 11 further comprising a first sensor adapted to determine a first material discharge door position and a second sensor adapted to determine a second material discharge door position.

18. The material control device of claim 11 wherein the means for moving the first material discharge door comprises a first linkage and the means for moving the second material discharge door comprises a second linkage.

19. The material control device of claim 18 wherein the first linkage is pivotally connected to the first material discharge door along the first material discharge door central axis and the second linkage is pivotally connected to the second material discharge door along the second material discharge door central axis.

20. A method for controlling material discharge, said method comprising:
   (a) providing a material control device adapted for use on a paver having a front end, a back end, and an auger, said material control device comprising:
      (i) a housing;
      (ii) a material discharge door, said material discharge door having a left end, a right end, and a central axis and being adapted to be moved between a closed position and an open position;
(ii) a means for moving the material discharge door between the closed position and the open position;
wherein the means for moving the material discharge door between the closed position and the open position slidingly moves the material discharge door between the closed position and the open position; and wherein the material discharge door is disposed in the back end of the paver below the auger; and wherein the material discharge door is disposed in a substantially horizontal position;
(b) moving the material discharge door between the closed position and the open position.

\* \* \* \* \*